United States Patent
Möbius et al.

(10) Patent No.: US 6,339,274 B1
(45) Date of Patent: Jan. 15, 2002

(54) ELECTRIC MOTOR ROTOR WITH PERMANENT MAGNETS

(75) Inventors: Marcos Romeu Möbius; Marcos Guilherme Schwarz, both of Joinville—Sc (BR)

(73) Assignee: Empresa Brasileira de Compressores S.A.-Embraco, Joinville (BR)

( * ) Notice: Subject to any disclaimer, the term of this patent is extended or adjusted under 35 U.S.C. 154(b) by 0 days.

(21) Appl. No.: 09/530,016

(22) PCT Filed: Oct. 22, 1998

(86) PCT No.: PCT/BR98/00085

§ 371 Date: Jun. 6, 2000

§ 102(e) Date: Jun. 6, 2000

(87) PCT Pub. No.: WO99/22435

PCT Pub. Date: May 6, 1999

(30) Foreign Application Priority Data

Oct. 24, 1997 (BR) ............................................. 9705306

(51) Int. Cl.$^7$ ............................................. H02K 21/14
(52) U.S. Cl. ............................. 310/156.28; 310/156.22; 310/91
(58) Field of Search ........................ 310/156.01, 156.08, 310/156.21, 156.23, 156.28, 156.29, 156.22, 91

(56) References Cited

U.S. PATENT DOCUMENTS

| | | | | |
|---|---|---|---|---|
| 4,219,752 A | * | 8/1980 | Katon ........................... | 310/156 |
| 4,433,261 A | * | 2/1984 | Nashiki et al. ............... | 310/156 |
| 4,639,627 A | * | 1/1987 | Takekoshi et al. ........... | 310/156 |
| 4,683,393 A | | 7/1987 | Stokes | |
| 5,073,738 A | * | 12/1991 | Tang ............................. | 310/91 |
| 5,563,463 A | * | 10/1996 | Stark ............................ | 310/156 |
| 5,596,238 A | * | 1/1997 | Milnikel ....................... | 310/103 |
| 5,675,204 A | * | 10/1997 | Kusumoto ..................... | 310/154 |
| 5,969,459 A | * | 10/1999 | Taniguchi et al. ............ | 310/263 |
| 5,998,902 A | * | 12/1999 | Sleder, Sr. et al. .......... | 310/153 |
| 6,084,330 A | * | 7/2000 | Fisher et al. .................. | 310/91 |

FOREIGN PATENT DOCUMENTS

DE     88 03 372     4/1988     ............ H02K/1/22

OTHER PUBLICATIONS

Patent Abstracts of Japan, *Manufacture of Rotor with Permanent Magnet*, Publication No. 08223836, Publication Date Aug. 30, 1996.

Patent Abstracts of Japan, *Non–Commutator Motor for Driving Compressor of Refrigerator, etc.*, Publication No. 56019369, Publication Date Feb. 24, 1981.

* cited by examiner

*Primary Examiner*—Nestor Ramirez
*Assistant Examiner*—Dang Dinh Le
(74) *Attorney, Agent, or Firm*—Darby & Darby

(57) ABSTRACT

An electric motor rotor with permanent magnets, the rotor including magnets (20) seated against a cylindrical lateral surface (11) of the core (10) of the rotor and a pair of annular caps (40), each cap being seated and affixed to an adjacent end face (12) of the core (10), the annular caps (40) limiting axial displacements of the magnets and defining, for both directions of circumferential displacement, stops for this displacement for each magnet (20), the confronting lateral edges (21) of a pair of consecutive magnets (20) being positioned by the annular caps (40), in order to define a previously established minimum circumferential distance.

12 Claims, 3 Drawing Sheets

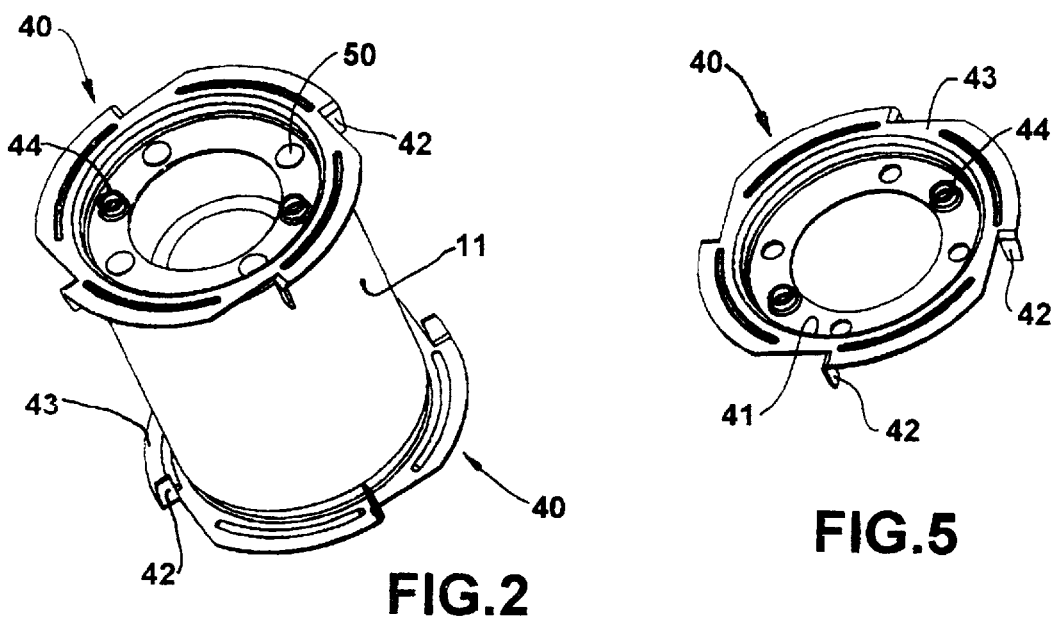
FIG.2
FIG.5
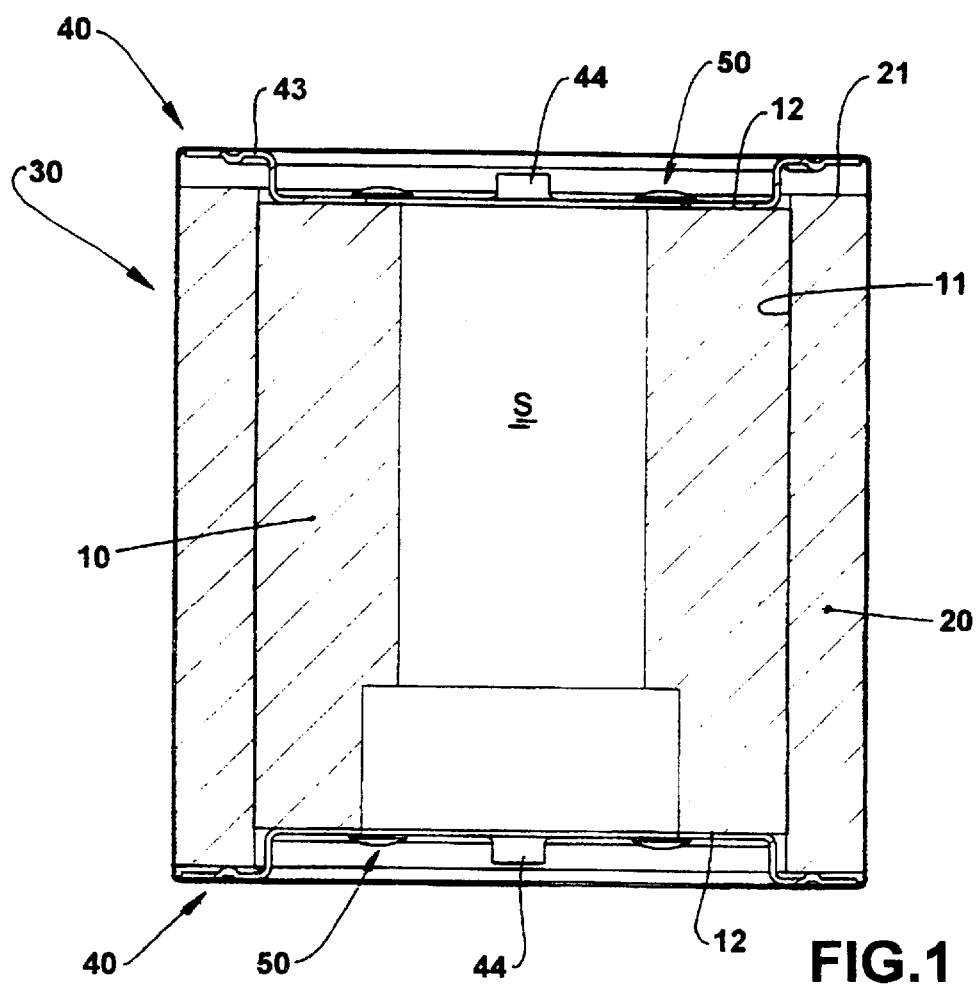
FIG.1

ELECTRIC MOTOR ROTOR WITH PERMANENT MAGNETS

This is a national phase application under 35 U.S.C. §371 of International Application No. PCT/BR98/00085, filed Oct. 22, 1998, and claims the benefit under 35 U.S.C. §119 Brazilian Pat. Application No. PI9705306-6, filed Oct. 24, 1997.

FIELD OF THE INVENTION

The present invention refers to a construction for a brushless electric motor rotor comprising a metallic core, which carries, on its lateral surface, circumferentially disposed magnets.

BACKGROUND OF THE INVENTION

In the known constructions for a brushless electric motor rotor, the permanent magnets, usually in the form of arcuated plates, are retained on a cylindrical core, usually made of iron, which may be laminated or massive and which is mounted around the motor shaft.

In these rotors, the magnets are provided in housings defined by longitudinal openings inside the metallic core or kept seated on the cylindrical lateral surface of the core through different fixation means, which are designed to impart to the mechanical structure the necessary resistance to centrifugal forces and to the motor operation.

In the rotor construction in which the magnets are affixed to the cylindrical lateral surface, one of the assembly problems results from the need to maintain the longitudinal axis of the magnets parallel to the longitudinal axis of the core. This positioning is usually obtained by providing external radial saliences incorporated to the surface of the rotor core or by equipments for carrying out the assembly of the unit during the manufacturing process.

These techniques have the inconvenience of making difficult the positioning of the magnets on the rotor surface during manufacture, which positioning should be angularly correct and provide a determined angular distance between the magnets. This difficulty is due to the degree of longitudinal freedom existing during assembly.

The positioning of the magnets on the rotor surface by means of external radial saliences of the core causes an assembly difficulty, which resides on the fact that the magnets are supported on only one of said saliences, since, during the operation of the motor or also during the mounting process of said rotor, the different thermal expansion of both the magnets and the core may generate high mechanical stresses concentrated on the magnets at the supporting region, in case the magnets are simultaneously supported on two opposite saliences. These stresses may cause failures caused by magnet breakage, as they are formed of ceramic material. In certain cases, even the support on only one salience can be critical.

After the formation of the rotor, with the magnets correctly positioned around the core, the rotor has to be positioned and mounted around the motor shaft, when positioning means are required to align the rotor during its assembly phase around the motor shaft. These positioning means also position the rotor for the posterior magnetization of the magnets, which has to be effected in a predetermined position of said magnets in relation to the motor structure. This positioning function is usually provided by bores, which are made in the magnetic core of the rotor and which reduce the amount of active material of said core, impairing the efficiecy of the motors or limiting the minimum size that the rotors may have, without the bores impairing relevantly the performance of said motor.

Another deficiency of the prior art is the high manufacturing cost of the rotors, as a function of the high investments required, when usually automatic positioning equipments are used.

DISCLOSURE OF THE INVENTION

Thus, it is an objective of the present invention to provide an electric motor rotor with permanent magnets, which allows the magnets to be precisely seated onto the external surface of the rotor core, without requiring constructive changes in the core or precision equipments.

Another objective of the present invention is to provide an electric motor rotor of the type having permanent magnets and which allows to simplify the automatic mounting process of the rotor.

These and other objectives are attained by an electric motor rotor with permanent magnets, said rotor including a core having a cylindrical lateral surface, against which are seated magnets having opposite lateral edges, said rotor comprising a pair of annular caps, each cap being seated and affixed onto an adjacent end face of the core, said annular caps limiting the axial displacements of the magnets and defining, for both directions of circumferential displacement, stops for this displacement for each magnet, the confronting lateral edges of a pair of consecutive magnets being positioned by said annular caps, in order to define a previously established minimum circumferential distance.

BRIEF DESCRIPTION OF THE DRAWINGS

The invention will be described below, with reference to the attached drawings, in which:

FIG. 1 illustrates, schematically and in a longitudinal sectional view, a rotor with the annular caps of the present invention disposed according to a mounting embodiment;

FIG. 2 shows, in a perspective view, a rotor provided with the annular caps of the present invention;

FIG. 5 shows a perspective view of the annular cap;

BEST MODE OF CARRYING OUT THE INVENTION

Figure 3:
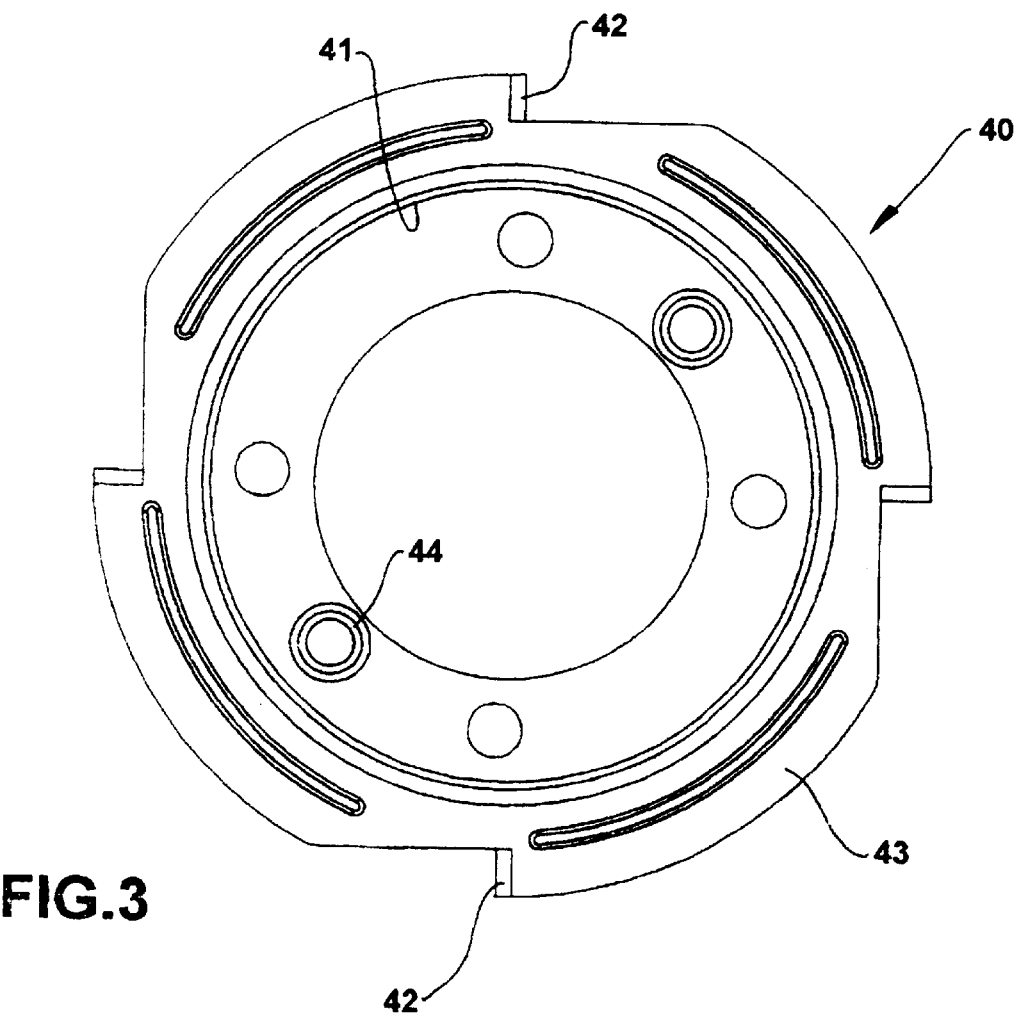
FIG. 3 illustrates an upper plan view of the annular cap of FIG. 1.
Figure 4:
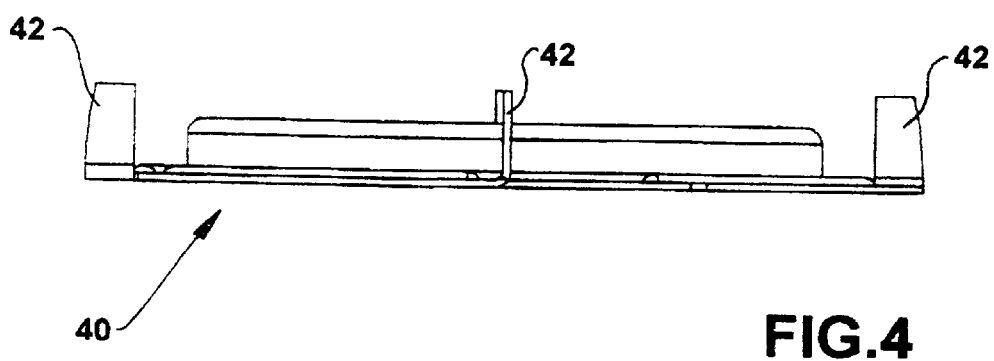
FIG. 4 shows a lateral view of the annular cap of FIG. 3.
Figure 6:
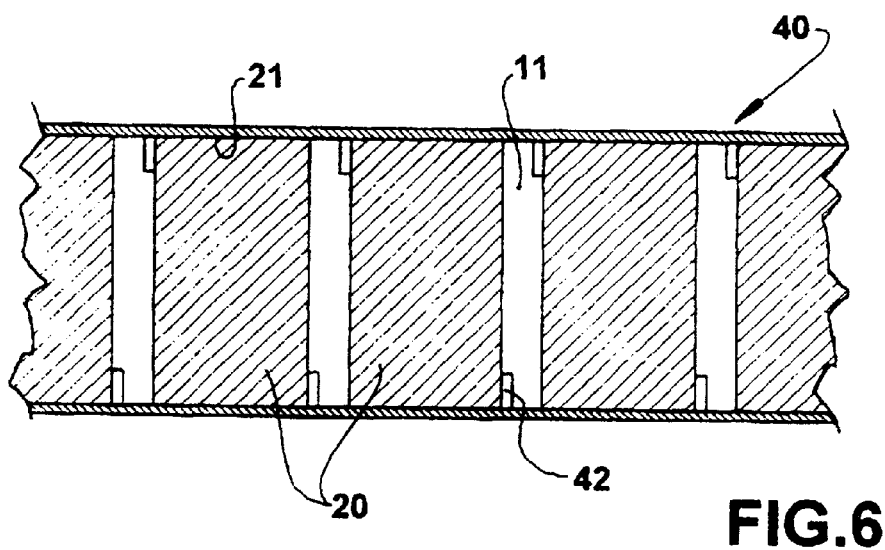
FIG. 6 shows, schematically, a plan view of a rotor provided with a pair of annular caps acting on the magnets of said rotor.

The present invention refers to an electric motor rotor of the type with permanent magnets and having a core 10 to be affixed around an extension of the motor shaft S and in whose cylindrical lateral surface 11 are seated magnets 20, usually in the form of arcuated magnetic plates, said magnets 20 being retained against the core 10, for example by gluing or by actuation of a tubular cylindrical cap 30, so that each of their respective lateral edges 21 be spaced from a confronting lateral edge 21 of an adjacent magnet by a previously determined minimum distance.

According to the present invention, the electric motor rotor further comprises a pair of annular caps 40 in a material with a permeability substantially inferior to that of the core 10, which is preferably made of a non-magnetic material, each cap being affixed to the core 10 and seated on an adjacent end annular face 12 of the latter, in order to cover or not the adjacent end 21 of the magnets 20, said annular caps 40 limiting the axial displacement of the magnets and defining, for both directions of circumferential displacement, stops for this displacement for each magnet 20, the confronting lateral edges 21 of a pair of consecutive magnets 20 being limited by said annular caps 40 so that, during the positioning of the magnets 20 on the rotor core, said lateral edges 21 do not surpass the previously established minimum circumferential distance for each two consecutive magnets 20.

Each annular cap 40 carries, from a peripheral edge 41 thereof, circumferential displacement limiting stops 42, which are, for instance, incorporated to the annular cap 40 and which will be described below, each stop limiting the circumferential displacement of a respective magnet 20 in one direction of circumferential displacement, each magnet 20 having its circumferential displacement, in both directions, limited by at least two circumferential displacement limiting stops 42, each one being mounted to one of the annular caps 40, adjacent to an end portion of a lateral edge 21, said circumferential displacement limiting stops 42 being adjacent to end portions of diagonally opposite lateral edges 21.

In another embodiment of the present invention, at least one of the annular caps 40 comprises circumferential displacement limiting stops 42 which limit both directions of circumferential displacement of a respective magnet 20.

In one solution of the present invention, the circumferential displacement limiting stops 42 are provided according to a same cicumferential alignment internal to the circumferential alignment of the external face of the magnets 20.

The fixation of the annular cap 40 to the core 10 is carried out appropriately, for example through a retaining element 50, which is longitudinally extended across the core 10 and which affixes the annular caps 40 to each other and to the core 10.

Though not illustrated, other forms of retaining the annular caps 40 to the core 10 are possible within the inventive concept presented (such as rivets, screws, etc.,) which may or may not extend throughout the axial length of the rotor core.

In the illustrated embodiments, each annular cap 40 incorporates, in a single piece, a peripheral annular flange 43, defined, for example on a plane which is parallel in relation to the plane of the annular cap 40, said peripheral annular flange 43 carrying the circumferential displacement limiting stops 42, for example in the form of axial ears incorporated to the annular cap 40 and projecting from the plane of the peripheral annular flange 43 of the latter and which are angularly spaced from each other, each defining a circumferential stop, acting against an end portion of a lateral edge 21 of a respective magnet 20, upon mounting the magnets around the rotor core. The peripheral annular flange may be further defined parallel or coplanar in relation to the plane of the annular cap 40.

The circumferential displacement limiting stops 42 should have a determined flexibility, sufficient to allow the deformation thereof, for example resulting from thermal expansion of the magnet for which it actuates as a circumferential displacement limiting means. An eventual deformation of said stops 42 avoids high stresses on the magnets 20 and the consequent damages caused to said magnets.

The annular caps are attached to the rotor, so that their circumferential displacement limiting stops 42 assure that the confronting lateral edges 21 of a consecutive pair of magnets 20 be positioned at a determined previously established minimum distance between said magnets when mounted around the rotor core.

Figure 7:
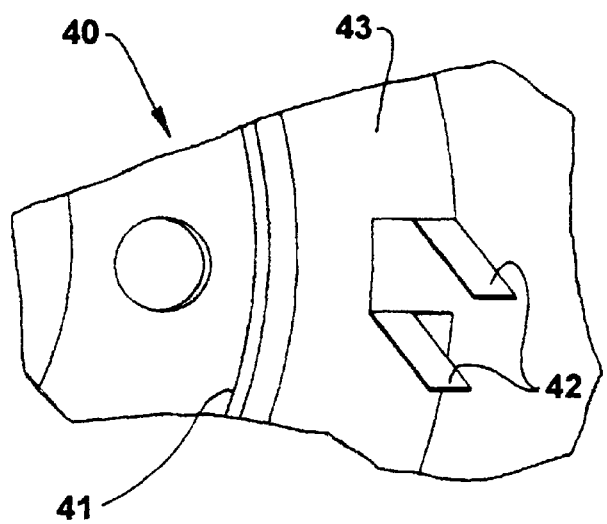
FIG. 7 shows, schematically and in a partially plan view another embodiment of the annular caps of the sent invention.

According to the embodiment illustrated in FIGS. 1–6, the minimum circumferential distance is achieved by the joint actuation of both annular caps 40. In this case, the annular caps 40 should be positioned one in relation to the other, so that their respective circumferential displacement limiting stops 42 be circumferentially offset by a value which positions to the magnets 20 with the minimum circumferential distance therebetween. In the embodiments illustrated in FIGS. 7 and 8, the circumferential displacement limiting stops 42 are provided in each annular cap 40 in order to define the minimum circumferential distance between each two adjacent magnets 20.

Figure 8:
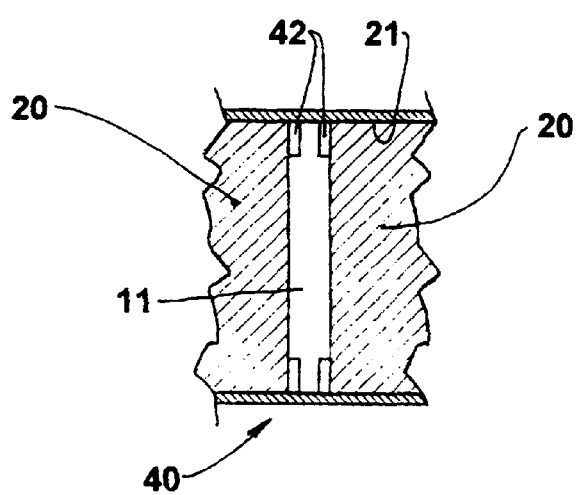
FIG. 8 illustrates, schematically, a detail of a peripheral portion of an annular cap, according to another embodiment of the present invention, using, for example the cap illustrated in FIG. 7.

In the embodiment illustrated in FIG. 8, the circumferential displacement limiting stops 42 are radially and angularly spaced from each other, in order to avoid mutual contact in any deformation condition of said magnets 20.

The circumferential displacement limiting stops 42 have their length dimensioned, considering the possible dimensional variations (and margins of error) in the length of said magnets. For the construction of FIGS. 7 and 8, the distance between each two adjacent circumferential displacement limiting stops 42 related to a respective magnet is defined taking into account the variations of circumferential extension (and margins of error) of said magnets 20.

The circumferential displacement limiting stops 42 of the present solution are designed to guarantee, upon assembly of the magnets 20 to the rotor core, a desired relative positioning between said magnets, without however necessarily acting against said magnets 20 during this assembly condition or even after obtaining the retaining condition of said magnets to the rotor core.

In the construction of FIG. 8, the annular caps 40 are attached to the rotor, so that their respective circumferential displacement limiting stops 42, acting on the same lateral edge portion 21 of each magnet 20 be axially aligned to each other. However, in order to obtain the positioning with the desired minimum distance, it is sufficient to have only one of the annular caps with adjacent circumferential displacement limiting stops 42, each limiting the positioning of a respective magnet 20.

According to the illustration in FIG. 1, the annular caps 40 are affixed to the core 10 so that each magnet 20 mounted to the core 10 has a pair of circumferential displacement limiting stops 42, each acting against an adjacent end portion of one of the diagonally opposite lateral edges 21.

In the illustrated embodiments, the circumferential displacement limiting stops 42 are also equally spaced from each other, as a function of their actuation in relation to the magnets 20. However, the distribution of the circumferential displacement limiting stops 42 throughout the peripheral annular flange 43 of each annular cap 40 may present variable spacings, defined as a function of the actuation of said circumferential displacement limiting stops 42 on each magnet 20.

The level difference between the plane of the annular cap 40 and its peripheral annular flange 43 allows the use of magnets having an axial length which may be larger or smaller than that of the rotor core.

The attachment of at least one of the annular caps 40 to the core 10 determines the circumferential positioning for retaining each magnet 20 to said core 10. The assembly of the annular cap 40 adjacently to the lower end face of the core 10 further determines an axial retention of said magnets 20 in relation to the core 10. This retention results from each magnet 20 being seated against an inner face of the peripheral annular flange 43 of the annular cap 40 located at the bottom of the core 10.

In the embodiment in which the circumferential displacement limiting stops 42 are in the form of axial ears, the latter may be formed with the same material of the corresponding cap 40 and incorporated in a single piece thereto (by stamping, casting, injection, etc.) and produced by one of the processes of folding, stamping, bending, etc., or may be affixed to the respective cap 40 by an adequate process, such as riveting, welding, gluing or mechanical interference. The axial ears 42 attachable to the annular cap 40 may be obtained from a different material than that which forms the annular cap 40.

The joint actuation of the pair of annular caps 40 in relation to the core 10 determines a circumferential and longitudinal alignment of the magnets 20 seated on the rotor core.

According to the present invention, each annular cap 40 is further provided with positioning means 44 in the form of bores or portions which are upwardly drawn from the surface of the annular cap 40, said positioning means 44 allowing the angular positioning of the rotor upon assembly of the magnets (or, eventually, during the formation or placement of the cap around said magnets), said positioning means 44 avoiding the need for providing bores in the magnetic core of the rotor and circumferentially locking the rotor in relation to the shaft S, during the assembly in any of the mounting positions of the magnets or cap, mainly when the latter is coiled.

With this construction, the assembly with the correct circumferential and longitudinal alignments of the magnets 20 in relation to the core 10 is achieved in a simple way, with no need for using sophisticated equipments, or removing material from the core 10, since no bores are made in the latter, making the motor more efficient and/or more compact. The circumferential displacement limiting stops 42 further avoid the occurrence of concentrations of mechanical stresses of thermal origin, which usually lead to breakage of the magnetic material.

While constructions were illustrated (FIGS. 6 to 8), in which the magnets 20 are tightly positioned in relation to each of the annular caps 40, particularly in relation to the respective annular flange 43 and axial ears 42, it should be understood that said constructions allow an assembly having axial and circumferential gaps between the magnets 20 and annular flange 43 and axial ears 42 of each annular cap 40.

Though not illustrated, the annular cap 40 of the present invention may present the circumferential displacement limiting stops 42 in the form of radial projections, each provided with a respective axial extension orthogonal to the plane of the annular cap, said radial projections acting in the circumferential locking of at least one adjacent magnet 20.

What is claimed is:

1. An electric motor rotor with permanent magnets, said rotor including a core (10) having a cylindrical lateral surface, against which are seated magnets (20) having opposite lateral edges (21), characterized in that it comprises a pair of annular caps (40), each cap being seated and affixed to an adjacent end face (12) of the core (10), said annular caps (40) limiting axial displacements of the magnets and defining, for both directions of circumferential displacement, stops for the circumferential displacement for each magnet (20), the opposing lateral edges (21) of a pair of consecutive magnets (20) being positioned by said annular caps (40), in order to define a previously established minimum circumferential distance, each annular cap (40) comprising positioning means (42), each one limiting the circumferential displacement of a respective magnet (20) in one direction of circumferential displacement, each magnet (20) having its circumferential displacement limited in both directions by two circumferential displacement limiting stops (42), each said limiting stop provided in one of the annular caps (40), said circumferential displacement limiting stops (42) which act on the same magnet (20) being seated against diagonally opposite end portions of lateral edges (21) of said magnet (20).

2. An electric rotor, as in claim 1, characterized in that the circumferential displacement limiting stops (42), which are provided in both annular caps (40) and which act on the same magnet (20), are each seated against the end portion of an adjacent lateral edge (21) of a magnet (20).

3. An electric motor rotor, as in claim 2, characterized in that the adjacent circumferential displacement limiting stops (42) of an annular cap (40), each limiting the circumferential displacement of a magnet (20) in one direction of displacement, are spaced from each other by a distance corresponding to the minimum circumferential spacing to be maintained between the magnets (20).

4. An electric motor rotor, as in claim 1, characterized in that each annular cap (40) incorporates, in a single piece, a peripheral annular flange (43) which carries the circumferential displacement limiting stops (42).

5. An electric motor rotor, as in claim 4, characterized in that the circumferential displacement limiting stops (42) are defined by axial ears attached to the peripheral annular flange (43).

6. An electric motor rotor, as in claim 5, characterized in that each axial ear is incorporated, in a single piece, to the respective annular cap (40).

7. An electric motor rotor, as in claim 6, characterized in that each axial ear is produced by one of the processes of stamping, folding and bending an extension of the peripheral annular flange (43) of the respective annular cap (40).

8. An electric motor rotor, as in claim 6, characterized in that the axial ears are attached by one of the processes of riveting, welding, gluing and mechanical interference.

9. An electric motor rotor, as in claim 1, characterized in that each annular cap (40) is obtained by one of the processes of stamping, injection and casting.

10. An electric motor rotor, as in claim 1, characterized in that the annular caps (40) and the circumferential displacement limiting stops (42) are provided in a material with a permeability substantially lower than that of the core (10).

11. An electric motor rotor, as in claim 1, characterized in that it includes, from an external face of each annular cap (40), positioning means (44) having at least one of the functions of angular positioning the rotor in relation to the motor shaft during the assembly of the magnets (20), formation of a cap around said magnets (20) and circumferentially locking the rotor in relation to the motor shaft (S), in any of the assembly conditions of said magnets (20) and said caps.

12. An electric motor rotor, as in claim 1, characterized in that each annular cap (40) incorporating the respective annular flange (43) and axial ears (42) is obtained by one of the processes of stamping, injection and casting, said annular flange (43) and said axial ears (42) being obtained, in the stamping operation, by one of the processes of folding and bending the annular cap (40).

* * * * *